United States Patent [19]

Takahashi

[11] Patent Number: 5,415,477
[45] Date of Patent: May 16, 1995

[54] HYDROSTATIC GAS BEARING CAPABLE OF EASILY ASSEMBLING BEARING UNITS KEEPING PERPENDICULARITY OF THE BEARING UNITS

[75] Inventor: Takeshi Takahashi, Yamatotakada, Japan

[73] Assignee: Koyo Seiko Co., Ltd., Osaka, Japan

[21] Appl. No.: 275,247

[22] Filed: Jul. 15, 1994

[30] Foreign Application Priority Data

Jul. 16, 1993 [JP] Japan ................. 5-176524

[51] Int. Cl.$^6$ .............................................. F16C 32/06
[52] U.S. Cl. ........................................ 384/119; 384/114
[58] Field of Search ................. 384/100, 103, 107, 114, 384/119, 120, 124

[56] References Cited

U.S. PATENT DOCUMENTS

| | | | |
|---|---|---|---|
| 3,476,447 | 11/1969 | Boyd | 384/120 |
| 4,514,099 | 4/1985 | John et al. | 384/100 |
| 4,674,952 | 6/1987 | Osterstrom | 384/114 X |
| 4,726,694 | 2/1988 | McFarlin et al. | 384/119 |
| 5,073,037 | 12/1991 | Fujikawa et al. | 384/120 |
| 5,219,447 | 6/1993 | Arvidsson | 384/107 X |

*Primary Examiner*—Thomas R. Hannon
*Attorney, Agent, or Firm*—Wenderoth, Lind & Ponack

[57] ABSTRACT

Provided is a hydrostatic gas bearing capable of assembling bearing units without deteriorating perpendicularity to an axis of a cylindrical housing even when the housing is distorted. The housing having a cylindrical hole through which a rotary shaft penetrates, cylindrical hydrostatic bearing units and a spacer of which axial end surfaces are perpendicular to a center axis of the spacer, and a cover which is mounted to the other end of the housing and presses a hydrostatic bearing unit via an O-ring. The hydrostatic bearing unit does not incline, since the end surface of the hydrostatic bearing unit is fitted tightly to an end surface of the spacer by the pressure from the O-ring, even when the other end of the housing is not perpendicular to the center axis of the housing and the cover is inclined.

4 Claims, 2 Drawing Sheets

HYDROSTATIC GAS BEARING CAPABLE OF EASILY ASSEMBLING BEARING UNITS KEEPING PERPENDICULARITY OF THE BEARING UNITS

BACKGROUND OF THE INVENTION

1. Field of the Invention

The present invention relates to a hydrostatic gas bearing for supporting a rotary shaft which is rotating at high speed.

2. Description of the Prior Art

There has been a conventional hydrostatic gas bearing of the above-mentioned type as shown in FIG. 3. The hydrostatic gas bearing has an approximately cylindrical housing 21, a ring-shaped first hydrostatic bearing unit 22 inserted in the housing 21, a ring-shaped spacer 23, and a ring-shaped second hydrostatic bearing unit 24. The first hydrostatic bearing unit 22, spacer 23, and second hydrostatic bearing unit 24 are radially supported on an inner peripheral surface of the housing 21 via O-rings 25 and 25, an O-ring 26, and O-rings 27 and 27, respectively. At the leftmost end in FIG. 3 of the housing 21 is formed an inner peripheral end portion 28, and an inner peripheral surface of the inner peripheral end portion 28 forms a through hole 31 in which a rotary shaft 30 is inserted. An opening portion 32 formed at the rightmost end in FIG. 3 of the housing 21 is engaged with a cover 33. An annular projection 33a which is provided on the cover 33 for pressing use axially supports the second hydrostatic bearing unit 24 to axially support the bearing units 22 and 24 and the spacer 23.

In the above-mentioned hydrostatic gas bearing, the rotary shaft 30 is inserted from the through hole 31 of the housing 21 into a through hole 22a of the bearing unit 22, a through hole 23a of the spacer 23, and a through hole 24a of the bearing unit 24. Then a pressured fluid is made to jet from a nozzle 22b of the bearing unit 22 and a nozzle 24b of the bearing unit 24 to radially support the rotary shaft 30.

However, in the above-mentioned conventional hydrostatic gas bearing, the housing 21 is distorted as shown in FIG. 3. When the opening portion 32 of the housing 21 has an end surface 38 which is not perpendicular to the center axis of the housing 21, the cover 33 is inclined apart from a direction perpendicular to the center axis. Due to the above-mentioned arrangement, the second bearing unit 24 has an excessive axial clearance with respect to a lower portion in FIG. 3, which makes the bearing unit 24 incline to cause an axial center of the bearing unit 24 to incline with respect to the center axis. The above fact results in the problem that the bearing unit 24 cannot obtain an appropriate radial gap with respect to the rotary shaft 30. Furthermore, a gap is generated between the bearing unit 24 and the adjacent spacer 23, and a break of airtightness takes place at the gap to result in the problem that the bearing capability is deteriorated.

In order to correct the inclination of the bearing unit, there has been a conventional technique of adjusting the inclination in assembling by means of a shim or the like, which is accompanied by the problem of increasing the number of processes in assembling of the bearing unit.

SUMMARY OF THE INVENTION

The object of the present invention is therefore to provide a hydrostatic gas bearing capable of easily assembling bearing units without deteriorating the perpendicularity of the bearing units with respect to the center axis even when the housing is distorted.

In order to achieve the aforementioned object, the hydrostatic gas bearing according to the first aspect of the present invention, including a housing having at least at its axial end a cylindrical hole through which a rotary shaft penetrates, a plurality of cylindrical hydrostatic bearing units inserted in the housing, a ring-shaped elastic member which is inserted between an inner peripheral surface of the housing and an outer surface of each of the hydrostatic bearing units and radially supports each of the hydrostatic bearing units, and a cover which is mounted to at least one of an axial end of the housing and the other axial end of the housing and axially supports the hydrostatic bearing units, wherein opposed axial end surfaces of each hydrostatic bearing unit are perpendicular to a center axis of the hydrostatic bearing unit, and an elastic member which is arranged between the cover and one of the hydrostatic bearing units adjacent to the cover and axially presses the hydrostatic bearing unit is further provided.

In the above-mentioned construction, when the axial end surface of the housing to which the cover is mounted is not perpendicular to the center axis of the housing and the cover is not perpendicular to the center axis, the gap between the cover and the hydrostatic bearing unit positioned closest to the cover is uneven.

In the present case, the elastic member is interposed between the hydrostatic bearing unit and the cover to axially press the hydrostatic bearing unit. The elastic member is weakly pressed in a wide gap and pressed strongly in a narrow gap to make the entire body of the elastic member opposite to the axial end surface of the hydrostatic bearing unit abut against the hydrostatic bearing unit. Then the hydrostatic bearing unit is urged by the elastic member to fit tightly to the adjacent hydrostatic bearing unit. Consequently, the axially opposite end surfaces of the hydrostatic bearing units are set perpendicular to the center axes of the hydrostatic bearing units, and therefore the center axes of the hydrostatic bearing units coincide with each other.

According to the second aspect of the present invention, the uneven gap is absorbed by the elastic member to allow the hydrostatic bearing units to be assembled with their center axes made to coincide with each other even when the housing is distorted.

According to the third aspect of the present invention, provided with a spacer of which both end surfaces are perpendicular to a center axis of the spacer, the spacer and the hydrostatic bearing units are axially pressed by the elastic member. With the above-mentioned arrangement, the members .can be assembled in the housing with their center axes made to coincide with each other even when the housing is distorted.

Furthermore, according to the fourth aspect of the present invention, provided with a ring-shaped elastic member, the elastic member abuts against the hydrostatic bearing unit by its entire peripheral surface to press the hydrostatic bearing units axially uniformly, with which the center axes of them securely coincide with each other.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The following describes in detail the present invention based on embodiments with reference to the attached drawings.

Figure 1:
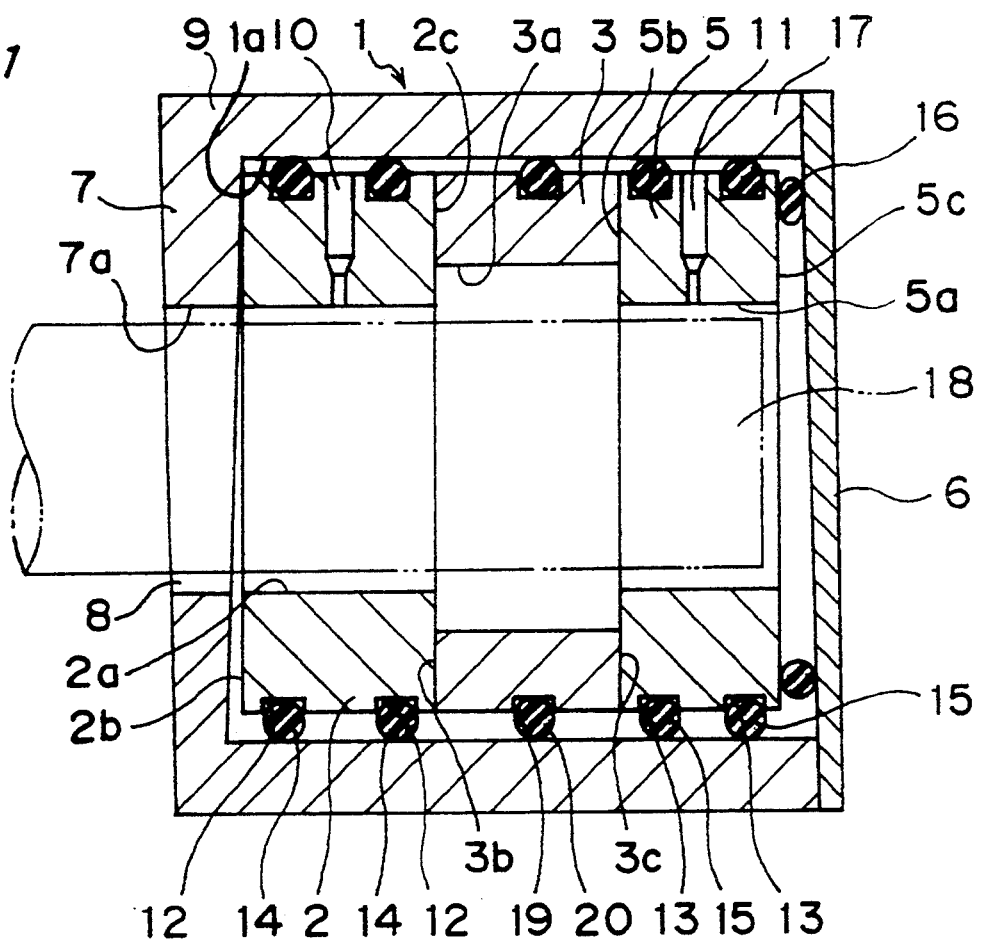
FIG. 1 is a sectional view of a hydrostatic gas bearing in accordance with a first embodiment of the present invention.
Figure 3:
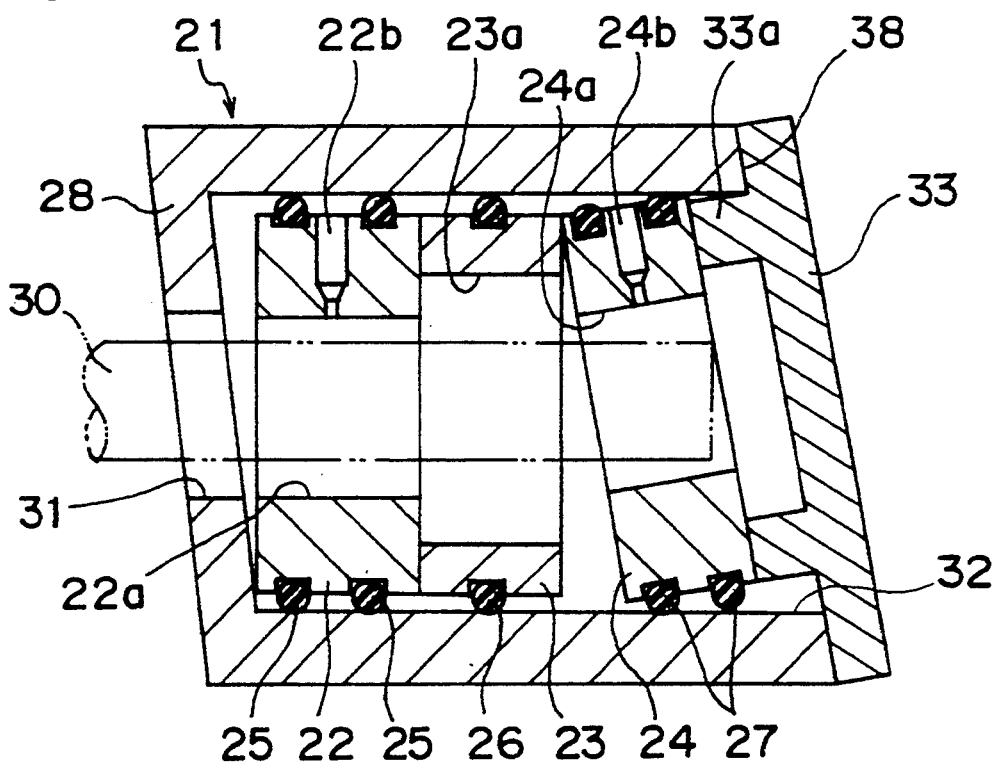
FIG. 3 is a sectional view of a conventional hydrostatic gas bearing.

FIG. 1 shows a sectional view of a hydrostatic gas bearing in accordance with a first embodiment of the present invention. The present embodiment includes a housing 1 having an inner peripheral cylindrical surface 1a, a first hydrostatic bearing unit 2 inserted in the housing 1, a spacer 3, a second hydrostatic bearing unit 5, and a cover 6.

The housing 1 is provided with an annular end portion 7 at its one axial end portion 9. An inner peripheral surface 7a of the end portion 7 forms a through hole 8.

In the first hydrostatic bearing unit 2 and the second hydrostatic bearing unit 5 are formed a radial nozzle 10 and a radial nozzle 11, respectively. The hydrostatic bearing units 2 and 5 have on their outer peripheral surfaces grooves 12 and 13 which are respectively engaged with O-rings 14 and 15 and radially supported by the O-rings 14 and 15 on the inner peripheral surface 1a of the housing 1. The spacer 3 is radially supported on the inner peripheral surface 1a of the housing 1 by an O-ring 20 engaged with a groove 19 formed on its outer peripheral surface.

The hydrostatic bearing unit 2 has its both axial end surfaces 2b and 2c arranged perpendicular to the center axis of its bearing hole 2a. The spacer 3 has its both axial end surfaces 3b and 3c arranged perpendicular to the center axis of its through hole 3a. The hydrostatic bearing unit 5 has its both axial end surfaces 5b and 5c arranged perpendicular to the center axis of its bearing hole 5a.

The cover 6 is mounted to the other axial end portion 17 of the housing 1 and axially supports the hydrostatic bearing unit 5 via an O-ring 16.

A rotary shaft 18 is inserted from the through hole 8 of the housing 1 into the bearing hole 2a of the hydrostatic bearing unit 2, the through hole 3a of the spacer 3, and the bearing hole 5a of the hydrostatic bearing unit 5. The rotary shaft 18 is radially supported by a pressured fluid jetted radially from the nozzle 10 of the hydrostatic bearing unit 2 and the nozzle 11 of the hydrostatic bearing unit 5.

In the hydrostatic gas bearing of the present embodiment, when the housing 1 is distorted as shown in FIG. 1, the cover 6 mounted to the end portion 17 of the housing 1 inclines apart from a direction perpendicular to the center axis of the housing 1. The above results in an uneven gap between the cover 6 and the hydrostatic bearing unit 5.

However, the O-ring 16 provided in the gap is pressed strongly in a portion where the gap is narrow and pressed weakly in a portion where the gap is wide between the cover 6 and the hydrostatic bearing unit 5 to make its entire surface opposite to the hydrostatic bearing unit 5 abut against the hydrostatic bearing unit 5. Therefore, the end surface 5b of the hydrostatic bearing unit 5 is fitted tightly to the end surface 3c of the spacer 3 as urged by the O-ring 16. As a result, the center axis of the hydrostatic bearing unit 5 coincides with those of the hydrostatic bearing unit 2 and the spacer 3.

Therefore, according to the present embodiment, the hydrostatic bearing units 2 and 5 and the spacer 3 can be assembled into the housing 1 so that the bearing holes 2a and 5a of the hydrostatic bearing units 2 and 5 and the through hole 3a of the spacer 3 inserted in the housing 1 can coincide with each other even when the housing 1 is distorted.

Therefore, according to the aforementioned first embodiment, the hydrostatic bearing units 2 and 5 and the spacer 3 can be coaxially assembled without increasing the machining accuracy of the housing nor requiring any jig for assembling or adjusting. Therefore, according to the first embodiment, a low-cost hydrostatic gas bearing capable of being easily assembled can be achieved.

Furthermore, since the hydrostatic bearing units 2 and 5 and the spacer 3 are assembled in the housing 1 via the O-rings 14, 15, 20, the center axes of the hydrostatic bearing units 2 and 5 and the spacer 3 can be also made to coincide with the center axis of the housing 1.

Although the O-ring 16 and the cover 6 are provided at only the end portion 17 of the housing 1 in the aforementioned first embodiment, a cover with a through hole may be mounted to the other end portion 9 in place of the end portion 7 with interposition of an O-ring between the cover and the bearing unit 2. Otherwise, it is acceptable to provide a through hole in a central portion of the cover 6 and make the rotary shaft 18 extend to penetrate through the through hole to make the rotary shaft 18 protrude from both ends of the housing 1.

Figure 2:
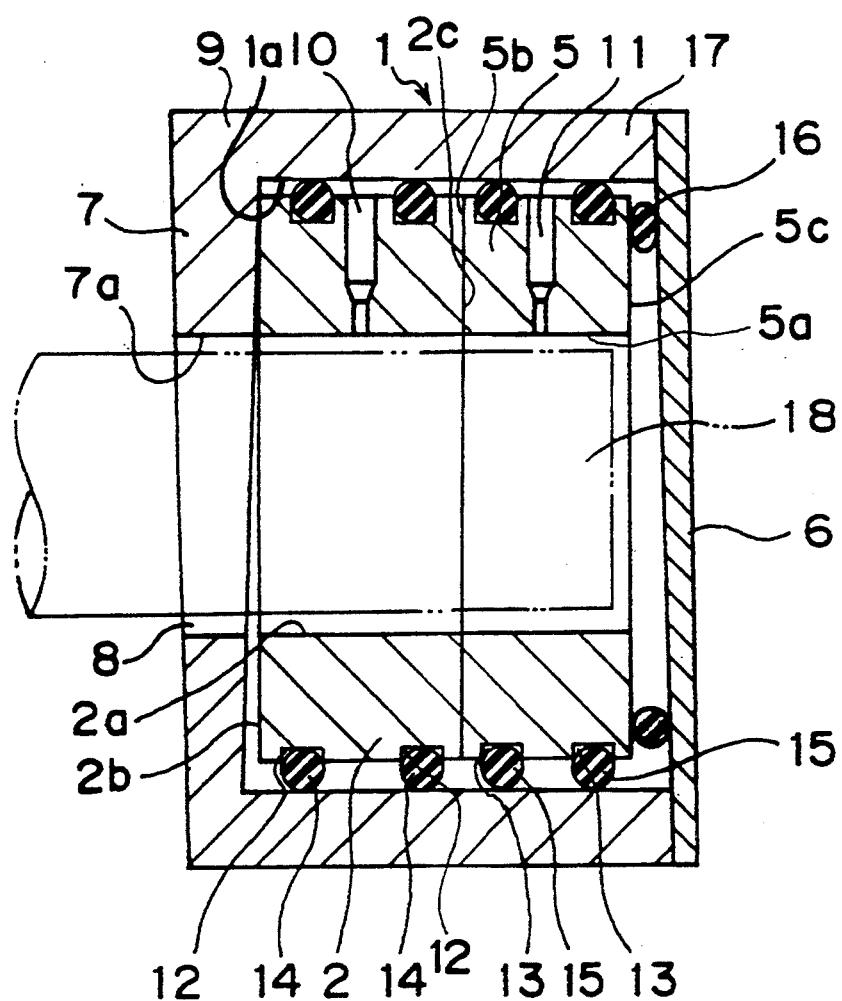
FIG. 2 is a sectional view of a hydrostatic gas bearing in accordance with a second embodiment of the present invention.

FIG. 2 shows a sectional view of a hydrostatic gas bearing in accordance with a second embodiment of the present invention. In the second embodiment, the spacer interposed between the two hydrostatic bearing units as in the first embodiment shown in FIG. 1 is eliminated to make both the hydrostatic bearing units 2 and 5 directly abut against each other. In FIG. 2, the same members as in FIG. 1 are denoted by the same numerals, and no description therefor is provided herein.

In the second embodiment, both the hydrostatic bearing units 2 and 5 have their end surfaces 2b, 2c, 5b, and 5c arranged perpendicular to the center axis of each hydrostatic bearing unit, and a ring-shaped elastic member 16 for axially pressing the hydrostatic bearing unit 5 is interposed between the cover 6 and the adjacent hydrostatic bearing unit 5. With the above-mentioned arrangement, the center axes of both the hydrostatic bearing units 2 and 5 and the center axis of the housing 1 can coincide with each other. Therefore, the same effect as described on the first embodiment can be obtained also in the second embodiment.

According to the hydrostatic gas bearing of the second embodiment as described above, a plurality of cylindrical hydrostatic bearing units are inserted in the cylindrical hole of the housing, and oppositely arranged axial end surfaces of each hydrostatic bearing unit are arranged perpendicular to the center axis of each unit. Further, the cover mounted to the axial end portion of the housing axially presses the hydrostatic bearing units via the elastic member to make the end surfaces fit tightly to each other.

According to the hydrostatic gas bearing of the first embodiment, the spacer of which both end surfaces are arranged perpendicular to the center axis is interposed between the adjacent hydrostatic bearing units.

Therefore, according to the aforementioned first or second embodiment, each hydrostatic bearing unit is fitted tightly to the adjacent hydrostatic bearing unit or spacer as urged by the compressed elastic member even when the axial gap between the cover and the hydrostatic bearing unit is uneven due to the distortion of the housing. Therefore, according to either of the aforementioned embodiments, the hydrostatic bearing units can be coaxially assembled without increasing the machining accuracy of the housing nor requiring any jig for assembling or adjusting. Therefore, according to either of the aforementioned embodiments, a low-cost hydrostatic gas bearing capable of being easily assembled can be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydrostatic gas bearing including a housing having at least at its axial end a cylindrical hole through which a rotary shaft penetrates, a plurality of cylindrical hydrostatic bearing units inserted in the housing, a ring-shaped elastic member which is inserted between an inner peripheral surface of the housing and an outer surface of each of the hydrostatic bearing units and radially supports each of the hydrostatic bearing units, and a cover which is mounted to at least one of an axial end of the housing and the other axial end of the housing and axially supports the hydrostatic bearing units, wherein opposed axial end surfaces of each hydrostatic bearing unit are perpendicular to a center axis of the hydrostatic bearing unit, and an elastic member which is arranged between the cover and one of the hydrostatic bearing units adjacent to the cover and axially presses the hydrostatic bearing unit is further provided.

2. A hydrostatic gas bearing as claimed in claim 1, wherein the hydrostatic bearing units are axially pressed by the elastic member to make the oppositely arranged end surfaces fit tightly to each other.

3. A hydrostatic gas bearing as claimed in claim 1, wherein a spacer is provided between adjacent ones of the hydrostatic bearing units with opposed end surfaces of the spacer arranged perpendicular to a center axis of the spacer, and the spacer and the hydrostatic bearing units are axially pressed by the elastic member to make the oppositely arranged end surfaces fit tightly to each other.

4. A hydrostatic gas bearing as claimed in claim 1, wherein the elastic member has a ring shape and abuts against axially adjacent members by its entire peripheral surfaces.

* * * * *